United States Patent [19]
Okabe et al.

[11] 3,915,887
[45] Oct. 28, 1975

[54] METHOD OF DISPERSING FOAMS IN LIQUID

[75] Inventors: Akio Okabe, Tokyo; Mototaka Kinoshita, Kashiwa; Tokio Ishii, Sakura, all of Japan

[73] Assignee: Lion Fat & Oil Co., Ltd., Tokyo, Japan

[22] Filed: Feb. 9, 1973

[21] Appl. No.: 330,996

[30] Foreign Application Priority Data
Feb. 14, 1972   Japan ............................. 47-014881

[52] U.S. Cl. ............ 252/307; 159/DIG. 4; 210/63; 252/359 E; 261/DIG. 5; 261/DIG. 26
[51] Int. Cl.² ............................................. B01J 13/00
[58] Field of Search ...................... 252/307, 359 E; 159/DIG. 4; 261/DIG. 26

[56] References Cited
UNITED STATES PATENTS

| | | | |
|---|---|---|---|
| 1,660,402 | 2/1928 | Thomson | 252/307 X |
| 1,687,067 | 10/1928 | Hinton | 252/307 X |
| 1,737,623 | 12/1929 | Thomson | 252/307 |
| 2,666,036 | 1/1954 | Schwencke | 261/DIG. 26 |
| 3,339,345 | 9/1967 | Sebald et al. | 252/359 E X |

*Primary Examiner*—Richard D. Lovering
*Attorney, Agent, or Firm*—Woodhams, Blanchard and Flynn

[57] ABSTRACT

A method of dispersing gas in an aqueous solution, which comprises: blowing said gas into a vessel containing an aqueous solution of a surface active agent through the bottom of said vessel; transforming said gas into a foam by means of an impeller equipped above the gas-blowing nozzle; and simultaneously preventing the occurrence of turbulent flow of said solution by means of an upright cylindrical meshwork screen having the top and bottom free of meshwork, which screen surrounds the impeller and incoming gas stream, said screen being spaced from the sidewall of the vessel and extending from adjacent the position at which gas enters the vessel toward the top of the level of said solution in the vessel.

5 Claims, 1 Drawing Figure

U.S. Patent    Oct. 28, 1975    3,915,887
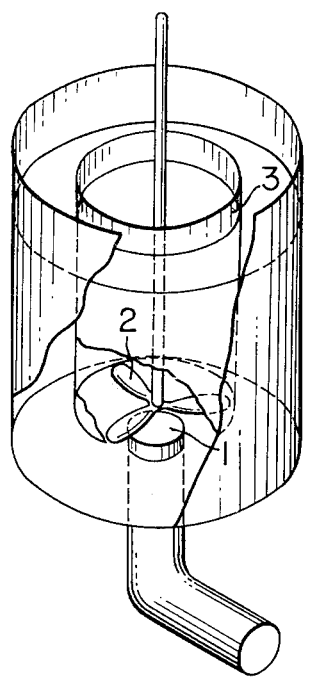

METHOD OF DISPERSING FOAMS IN LIQUID

BACKGROUND OF THE INVENTION

As the typical methods of dispersing a gas in a liquid, there are known the method of dispersing a gas in a liquid through porous plates and the method of dispersing a gas in a liquid by making said gas strike against an impeller after blowing it into said liquid. And it is a known fact that, at the time of such dispersing, the presence of a surface active agent in said liquid has the effect of making the foams fine. However, according to the former method, inasmuch as it employs a porous plate, a remarkable gas-pressure drop ascribable to this porous plate is inevitable, and therefore, application of this method is impossible in the case where a great volume of gas is supplied in a liquid. In the latter method, on the other hand, stirring gives rise to not only whirlpools but also turbulent flows whereby the liquid is rolled in downwards. According to the findings of the inventors of the present invention, however, this turbulent flow has a demerit that it brings about collision and mergence of foams, resulting in impairment of the gas-liquid contact efficiency.

SUMMARY OF THE INVENTION

The present invention is intended to improve the conventional method of dispersing gas in a liquid as set forth above. To be precise, the method of dispersing gas in a liquid according to the present invention is a method of blowing a gas into an agueous solution wherein a surface active agent is present, which comprises: blowing a gas into an aqueous solution through a gas-blowing nozzle opening upward or downward at the bottom of said aqueous solution; transforming said gas into a foam by means of an impeller equipped above said gas-blowing nozzle; and simultaneously preventing the occurrence of turbulent flow of said solution by means of a meshwork screen installed surrounding said impeller.

BRIEF DESCRIPTION OF THE DRAWING

The appended drawing is a schematic representation of a prespective view of an apparatus, with a part of the vessel wall cut away, which may be utilized for practicing one embodiment of the present invention. The numeral references 1, 2 and 3 in the drawing show the gas-blowing nozzle, the impeller and the meshwork screen, respectively, according to the present invention.

DESCRIPTION OF THE PREFERRED EMBODIMENTS

As the surface agent to be present in an aqueous solution in the present invention, any kind of said agent will suffice. In other words, the method of the present invention is applicable to any aqueous solution wherein at least one member selected from the group consisting of anionic surface active agent, cationic surface active agent, nonionic surface active agent and amphoteric surface active agent is present. The desirable amount of said surface active agent to be present in an aqueous solution is generally 10 ppm or more, but even in case said amount is less than 10 ppm, the method of the present invention is applicable.

It is appropriate to arrange the impeller disposed above the gas-blowing nozzle so as to rotate at a peripheral velocity in the range of usually 2 to 20 m/sec, — preferably 6 to 12 m/sec. Further, the appropriate diameter of the rotor of said impeller is about ⅞ to ¼ of the diameter of the vessel containing said aqueous solution. As the meshwork screen surrounding said impeller, a screen having about 1 to 100 meshes, preferably about 6 to 32 meshes, is applicable. As to the shape of said screen, it can be of either a cylinder-shape or an angular tube-shape. The length of the meshwork screen is generally sufficient to cover the distance between the gas-blowing nozzle and the level of the aqueous solution. The inside diameter of said meshwork screen is about ½ to ⅔ of the diameter of the vessel containing said aqueous solution. In this connection, the optimum amount of the feed gas per minute in practicing the method of the present invention is less than about 5 times as much as the volume of the aqueous solution: when the amount of the feed gas per minute is about 5 times as much as the volume of the aqueous solution or more, there is a fear of causing short-circuiting of the gas.

According to the present invention, it is possible to effectively prevent the occurrence of turbulent flows incident to the operation of dispersing a gas with an impeller, by virtue of a meshwork screen, and therefore, it is possible to disperse fine gas foams in a liquid uniformly. Accordingly, application of the gas-foam dispersing method of the present invention to a foam separation process renders it possible to achieve the object of the process very efficiently. Not only that, in the case of an aqueous solution containing a surface active agent wherein substances capable of oxidation by air, namely, such inorganic compounds as sulfite, thiosulfate, such organic compounds as present in waste waters arising from manufacturing pulp, starch, dairy products, live-stock industry, etc. wherein substances giving rise to COD and/or BOD are present, said substances can be efficiently oxidized by the us of an oxygen-containing gas such as air as the gas to be blown therein. And the present invention demonstrates a remarkable effect when applied to domestic waste water as well as industrial waste water containing a surface active agent.

Further particulars of the method of the present invention and the effects thereof will be given in the following by reference to some examples embodying the present invention.

EXAMPLE 1.

500 $l$ of an aqueous solution containing sodium α-olefin sulfonate having a carbon atoms 15 to 18 (hereinafter called AOS for short) at a concentration of 50 ppm was stocked in a gas-foam dispersing vessel having a diameter of 1,000 mm. This gas-foam dispersing vessel was provided with a gas-blowing nozzle with a bore of 5 mm installed on the bottom,, a 4-bladed impeller with the diameter of the rotor being 300 mm installed above said nozzle and further a cylindrical meshwork screen (meshwork of 10 meshes) with a diameter of 500 mm and a length to come up to the level of said AOS aqueous solution as installed surrounding said impeller.

When the operation of rotating the impeller at 600 r.p.m. while blowing 500 $l$ of air per minute into said AOS aqueous solution at the temperature of 25°C through said gas-blowing nozzle was continued for 30 minutes, the concentration of AOS in the aqueous solution decreased to 7 ppm.

For the purpose of comparison, the same test as above was conducted on two modifications of the foregoing apparatus: namely, the case wherein said cylindrical meshwork screen was not provided; and the case wherein in lieu of said cylindrical meshwork screen, 4 baffle plates were provided on the inner wall of the gas-foam dispersing vessel. As a result, the concentration of AOS in the aqueous solution was 30 ppm in the former case, while it was 20 ppm in the latter case.

EXAMPLE 2.

Under the same conditions as in Example 1 except for the use of a domestic waste water in lieu of the AOS aqueous solution employed for Example 1, said domestic waste water was treated and the decrease in COD as well as the concentration of anionic surface active agent was measured. The domestic waste water for use in the present example originally contained an anionic surface active agent at the concentration of 10 ppm. The result of test was as shown in the following table. For the purpose of comparison, the result of another test conducted by omitting said cylindrical meshwork screen from the apparatus employed for the present example is also shown in the same table.

EXAMPLE 3.

A gas-blowing nozzle having the bore of 25 mm was installed on the bottom of a gas-foam dispersing vessel with a diameter of 1,500 mm and a capacity of 2 K$l$, and on the top of said nozzle, there was installed an impeller having 6 flat turbine blades with the diameter of the rotor being 500 mm. Further, a cylindrical meshwork screen (meshwork of 10 meshes) with a diameter of 900 mm was installed so as to surround said impeller. AOS aqueous solution containing sodium sulfite to the extent of 200 ppm was continuously fed to this gas-foam dispersing vessel while introducing air into the same through the gas-blowing nozzle at the rate of 1 Nm$^3$/min. (at standard state) and rotating the impeller at 400 r.p.m., whereby the treated solution was continuously discharged from the bottom of the gas-foam dispersing vessel and the residence time of said solution in the vessel was set at 30 minutes. The AOS concentration in the solution was maintained at 50 ppm. When the concentration of sodium sulfite in the solution discharged from the bottom of the vessel at a steady state was measured, it was as low as 5 ppm. In this connection, the temperature of the solution employed for the test was 25°C, and the cylindrical meshwork screen was of a length coming up to the level of said solution.

For the purpose of comparison, another test was conducted under the same conditions as above except for omitting the cylindrical meshwork screen from the apparatus employed for the present example. As a result, the concentration of sodium sulfite in the solution discharged from the bottom of the vessel was no more than 50 ppm.

What is claimed is:

1. A process for dispersing gas in an aqueous liquid containing a surface active agent, which comprises:
    continuously blowing a stream of gas into the central portion at the bottom of a vessel containing said liquid; continuously rotating an impeller disposed in said vessel above and closely vertically spaced from the position at which the gas enters the vessel to generate a foam in said liquid; and simultaneously preventing the occurrence of turbulent flow of said liquid by flowing said liquid through an upright cylindrical meshwork screen having the top and bottom free of meshwork, which screen surrounds the impeller and the incoming gas stream, said screen being spaced from the sidewall of the vessel and extending from adjacent the position at which the gas enters the vessel toward the top of the level of said liquid in the vessel.

2. A process according to claim 1, wherein the concentration of the surface active agent in said liquid is at least 10 ppm, the peripheral velocity of said impeller is in the range of 2 to 20 m/sec, the diameter of said impeller is about ⅞ to ¼ of the diameter of the vessel, the inside diameter of said meshwork screen is in the range of about ½ to ⅔ of the diameter of the vessel, the mesh size of said screen is in the range of about 1 to 100 mesh, and the volume of the gas blown into the vessel, per minute, is less than 5 times the volume of said liquid in the vessel.

3. A process according to claim 2, in which the peripheral velocity of the impeller is from 6 to 12 m/sec. and the screen has a mesh size of from 6 to 32 mesh.

4. A process according to claim 1, in which the screen extends to the top of the level of the liquid in the vessel.

5. A process according to claim 1, in which said gas is air.

* * * * *

UNITED STATES PATENT AND TRADEMARK OFFICE
CERTIFICATE OF CORRECTION

PATENT NO. : 3 915 887
DATED : October 28, 1975
INVENTOR(S) : Akio Okabe, Mototaka Kinoshita and Tokio Ishii It is certified that error appears in the above-identified patent and that said Letters Patent are hereby corrected as shown below:

Column 4, line 32; the phrase "7/8 to 1/4" should read ---1/3 to 1/4---.

Signed and Sealed this ninth Day of March 1976

[SEAL]

Attest:

RUTH C. MASON
*Attesting Officer*

C. MARSHALL DANN
*Commissioner of Patents and Trademarks*